US010174798B2

(12) United States Patent
Dennis et al.

(10) Patent No.: US 10,174,798 B2
(45) Date of Patent: Jan. 8, 2019

(54) SPRING APPLIED, HYDRAULICALLY RELEASED WHEEL-MOUNT BRAKE HAVING IMPROVED STATIONARY DISC SUPPORT

(71) Applicant: Ausco Products, Inc., Benton Harbor, MI (US)

(72) Inventors: Brian P. Dennis, Kalamazoo, MI (US); Nancy L. Leonard, Dowagiac, MI (US); Howard H. Baldeosingh, Stevensville, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 29 days.

(21) Appl. No.: 15/587,962

(22) Filed: May 5, 2017

(65) Prior Publication Data

US 2017/0335909 A1 Nov. 23, 2017

Related U.S. Application Data

(60) Provisional application No. 62/337,957, filed on May 18, 2016.

(51) Int. Cl.
*F16D 55/40* (2006.01)
*F16D 65/12* (2006.01)
(Continued)

(52) U.S. Cl.
CPC ............ *F16D 55/40* (2013.01); *F16D 55/36* (2013.01); *F16D 65/12* (2013.01); *F16D 65/186* (2013.01);
(Continued)

(58) Field of Classification Search
CPC .......... F16D 55/40; F16D 55/36; F16D 65/12; F16D 65/186; F16D 2055/0033;
(Continued)

(56) References Cited

U.S. PATENT DOCUMENTS

| 4,263,991 A * | 4/1981 | Morgan ................. B60T 13/16 188/170 |
| 7,909,147 B1 | 3/2011 | Schnell |
| 2007/0045059 A1 | 3/2007 | Dennis et al. |

FOREIGN PATENT DOCUMENTS

EP 1 234 993 A1 8/2002

OTHER PUBLICATIONS

Partial European Search Report (Application No. 17171670.7) (11 pages—dated Nov. 17, 2017).

\* cited by examiner

*Primary Examiner* — Melanie Torres Williams
(74) *Attorney, Agent, or Firm* — Renner, Kenner, Greive, Bobak, Taylor & Weber

(57) ABSTRACT

A brake (10) includes a housing (12) formed from a first housing portion (14) capable of receiving a second housing portion (16). The first housing portion (14) houses a piston (18) and a plurality of springs (20), and the second housing portion (16) houses an alternating arrangement of discs (52) for enacting a braking function. The second housing portion (16) further includes torque pin holes (80) for receiving torque pins (82) therein. Each torque pin (82) is secured with a plug (84) to secure stationary discs (54A, 54B, 54C) in place. The stationary discs (54A, 54B, 54C) have extending ears (74) positioned between torque pin grooves (76), which further receive the torque pins (82).

19 Claims, 12 Drawing Sheets

(51) Int. Cl.
*F16D 55/36* (2006.01)
*F16D 65/18* (2006.01)
F16D 121/06 (2012.01)
F16D 121/14 (2012.01)
F16D 55/00 (2006.01)
F16D 65/02 (2006.01)
F16D 121/12 (2012.01)

(52) U.S. Cl.
CPC ............... *F16D 2055/0033* (2013.01); *F16D 2065/1372* (2013.01); *F16D 2121/06* (2013.01); *F16D 2121/12* (2013.01); *F16D 2121/14* (2013.01); *F16D 2250/0084* (2013.01)

(58) Field of Classification Search
CPC ......... F16D 2065/1372; F16D 2121/12; F16D 2121/14; F16D 2250/0084
See application file for complete search history.

US 10,174,798 B2

SPRING APPLIED, HYDRAULICALLY RELEASED WHEEL-MOUNT BRAKE HAVING IMPROVED STATIONARY DISC SUPPORT

CROSS REFERENCE TO RELATED APPLICATION

This application claims the benefit of U.S. Provisional Application No. 62/337,957, filed May 18, 2016, which is incorporated herein by reference.

TECHNICAL FIELD

This invention relates to a spring applied, hydraulically released brake. More particularly, this invention relates to a spring applied, hydraulically released brake that includes an improved stationary disc support.

BACKGROUND

Scissor lift and telehandler vehicles are known to use spring applied, hydraulically released brakes as a parking brake. These vehicles generally use multi-disc parking brakes located at the wheels of the vehicle. These brakes generally utilize hydraulic fluid to create hydraulic pressure in order to release the brake. The source of this hydraulic pressure is usually from vehicle hydraulics, since these vehicles generally include a hydraulic system. Brakes for these vehicles are generally built using several sand cast iron components, which are then machined to a finished state. This is expensive and inefficient. Brakes for these vehicles also must be compact with regard to space as available space for the brakes is limited. When considering replacement brakes for these vehicles, the available space cannot be changed or increased.

Thus, there is a need for a brake that offers one or more improvements over the prior art, such as optimization of available space within a brake housing and a reduction of materials over known brakes.

DISCLOSURE OF THE INVENTION

It is thus an object of one aspect of the present invention to provide a spring applied, hydraulically released brake that reduces machining operations by using near net shape die cast components, requiring minimal capital investment.

It is an object of another aspect of the present invention to provide a brake, as above, where the stationary discs thereof are supported within the brake in a more compact and effective manner, easing assembly.

It is an object of a further aspect of the present invention to provide a brake, as above, that can be installed in a like-for-like manner in the place of certain prior art brakes.

These and other objects of the present invention, as well as the advantages thereof over existing prior art forms, which will become apparent from the description to follow, are accomplished by the improvements hereinafter described and claimed.

In general, a brake made in accordance with the present invention includes a first housing portion and a second housing portion, the second housing portion having a distal end. An alternating arrangement of stationary and rotating discs are in the second housing portion. The stationary discs include an inboard stationary disc. At least two torque pin holes extend from the inboard stationary disc to the distal end of the second housing portion. A torque pin is positioned in each of the torque pin holes to secure the stationary discs in a stationary position with respect to the second housing portion.

In accordance with another aspect of the invention the brake includes a first housing portion and a second housing portion. An alternating arrangement of stationary discs and rotating discs are in the second housing portion, each of the stationary discs having an ear extending between two torque pin grooves. A relief is positioned in the second housing portion and is capable of receiving each ear therein. At least two torque pin holes are provided in the second housing portion and a torque pin is positioned in each of the hole and in the torque pin grooves.

In accordance with yet another aspect of the invention, the brake includes a first housing portion and a second housing portion. A piston is provided in the first housing portion and includes a body portion with a projecting flange extending therefrom toward the second housing portion. The projecting flange has an outer cylindrical surface. The second housing projecting flange has an inner cylindrical surface which engages the outer cylindrical surface of the projecting flange of the piston.

A preferred exemplary brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 7:
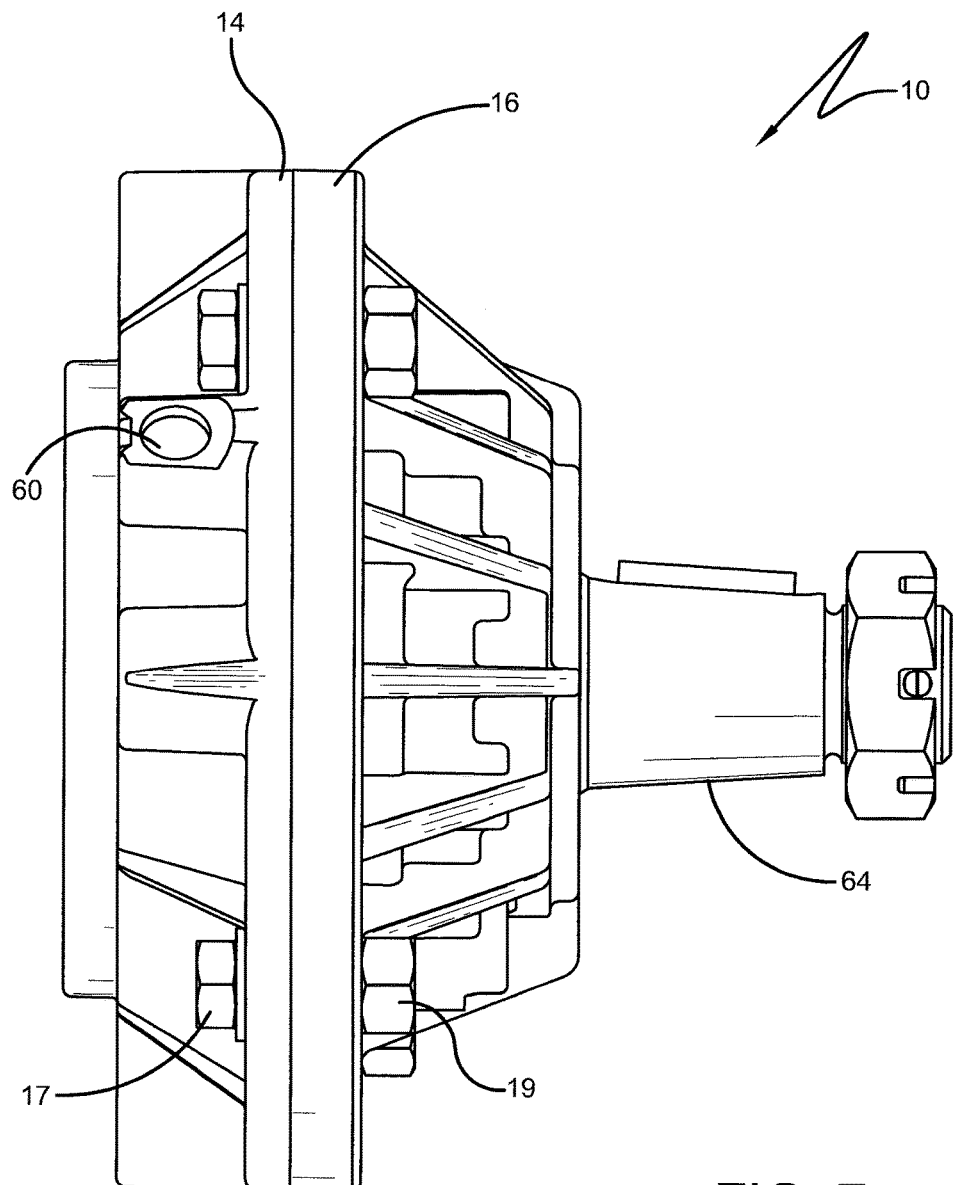
FIG. 7 is a side elevational view of a brake according to the concepts of the present invention.

A brake according to the concepts of the present invention is generally indicated by the numeral 10. Brake 10 includes a housing, generally indicated by the numeral 12, which carries and protects components of brake 10 and locates it in operative relation to a conventional wheel. Housing 12 is formed from two main pieces—a first housing portion 14 that is capable of receiving a second housing portion 16—that can be secured in respective position with each other using one or more fasteners, such as bolt 17 and nut 19 (FIG. 7). As will be described further herein, second portion 16 includes a protrusion that fits into a bore of first portion 14.

First housing portion 14, which can also be described as a power plate 14, houses a spring applied, hydraulically released (SAHR) assembly, which includes a piston 18 and a plurality of springs 20 capable of acting on piston 18. Piston 18 includes a body portion 22 including one or more spring housings 24 to receive springs 20 therein. Spring housing 24 can also be described as a cutout 24 formed in piston 18. A first end of each spring 20 engages piston 18 and a second end of each spring 20 engages first housing portion 14. As will be described further herein, in a "default" position, springs 20 cause piston 18 to engage a disc stack to thereby enact a braking function.

Piston 18 is specifically housed in a piston bore 26 of first portion 14. Piston body portion 22 includes an outer cylindrical surface 28 that engages the chamber formed by piston bore 26. Outer cylindrical surface 28 may include a sealing ring, such as a combination of O-ring 30A and backup ring 30B, to allow a small clearance between outer cylindrical surface 28 and bore 26 while still preventing fluid from leaking past this seal.

First housing portion 14 further includes a pilot bore 32 for receiving a component of second housing portion 16. Specifically, second housing portion 16 includes a body portion 34 with a projecting flange 36 extending therefrom toward first portion 14. Projecting flange 36 includes an outer cylindrical surface 38 that engages the chamber formed by pilot bore 32. Outer cylindrical surface 38 may include a sealing ring, such as a combination of O-ring 40A and back up ring 40B, to allow a small clearance between outer cylindrical surface 38 and bore 32 while still preventing fluid from leaking past this seal.

First housing portion 14 also includes a relief bore 41 between piston bore 26 and pilot bore 32. Piston bore 26 and pilot bore 32 have a similar, or substantially similar, bore diameters, and the relief bore 41 has a slightly larger bore diameter than piston bore 26 and pilot bore 32. Thus, piston bore 26 and pilot bore 32 may be machined in the same machining step, with relief bore 41 being subsequently machined. Notably, relief bore 41 may include rounded lips 42, which prevent O-ring 30A from traveling across a sharp corner. Relief bore 41 also generally does not require the same fine surface finish as piston bore 26 and pilot bore 32 because it is not being used as a sealing surface. That is, sealing surfaces are generally those surfaces needing a fine surface finish such that an O-ring is not damaged or worn as it slides across the surface. The rougher the finish, the more wear occurs on an O-ring. A finer surface finish is also less likely to leak due to the peaks and valleys of a rougher surface finish. With respect to the present brake 10, since bore 41 is not a sealing surface, it is not going to wear the O-ring or cause leaks. Bore 41 and rounded lips 42 may be subjected to some amount of surface finish to ensure there is no wear or snags on O-ring 30A during assembly of piston 18 in brake 10.

Pilot projecting flange 36 includes an inner cylindrical surface 44 that engages a projecting flange 46 extending from body portion 22 of piston 18 toward second portion 16. More specifically, inner cylindrical surface 44 engages an outer cylindrical surface 48 of piston projecting flange 46. Outer cylindrical surface 48 may include a sealing ring, such as a combination of O-ring 50A and back up ring 50B, to allow a small clearance between outer cylindrical surface 48 and inner cylindrical surface 44 while preventing fluid from leaking past this seal.

As previously described, the "default" position of piston 18 allows springs 20 to cause projecting flange 46 to engage a disc stack, generally indicated by the numeral 52, to thereby enact a braking function. Particularly, projecting flange 46 engages a proximate, or inboard, stationary disc 54A of disc stack 52. Thus, the spring force of springs 20 must be selectively overcome in order to move piston 18 to an unactuated position to disengage disc stack 52.

Figure 4:
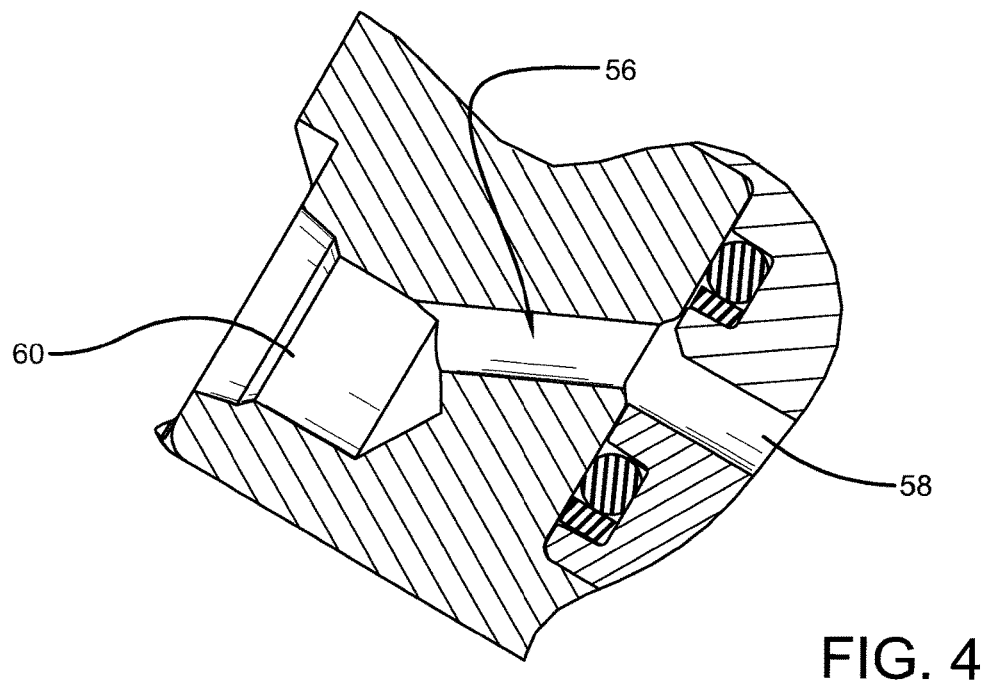
FIG. 4 is a sectional view of a hydraulic fluid port taken substantially along line D-D of FIG. 1.
Figure 5:
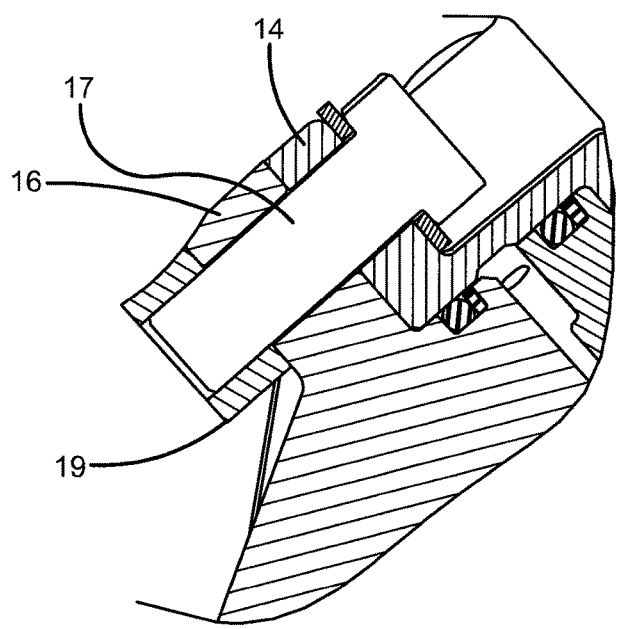
FIG. 5 is a sectional view of a bolt for securing a first housing portion with a second housing portion taken substantially along line E-E of FIG. 1.
Figure 6:
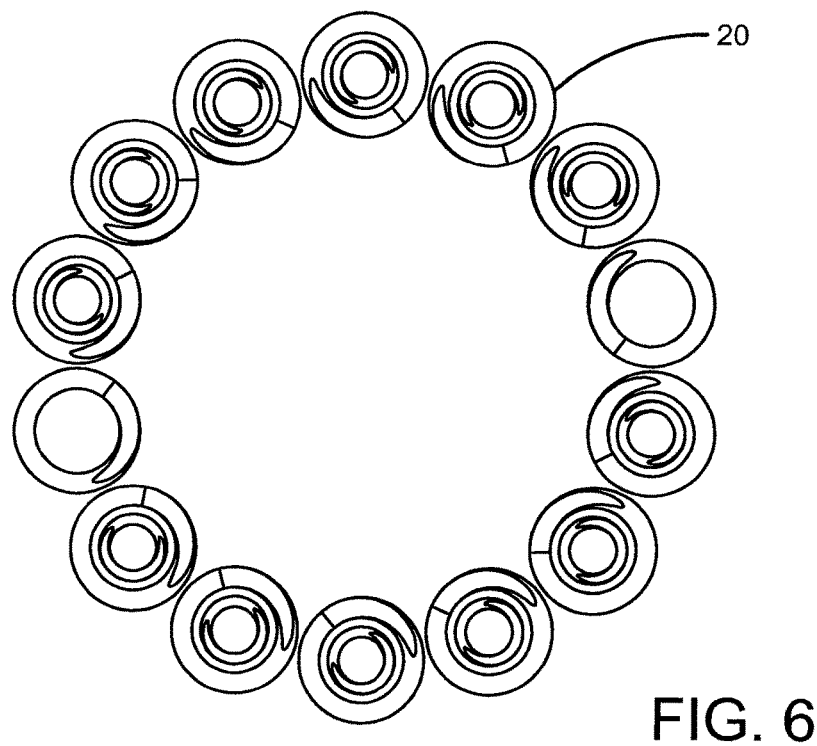
FIG. 6 is an elevational view of a plurality of springs.

To accomplish this, a hydraulic fluid supply network, generally indicated by the numeral 56 (FIG. 4), provides pressurized fluid to a fluid chamber 58. Fluid chamber 58 is in the general position of relief bore 41. By way of fluid chamber 58, piston 18 can be said to be in fluid communication with a source of hydraulic fluid. Upon adding hydraulic fluid to fluid chamber 58, the hydraulic fluid fluidly engages piston 18 so as to apply force against springs 20.

Figure 1:
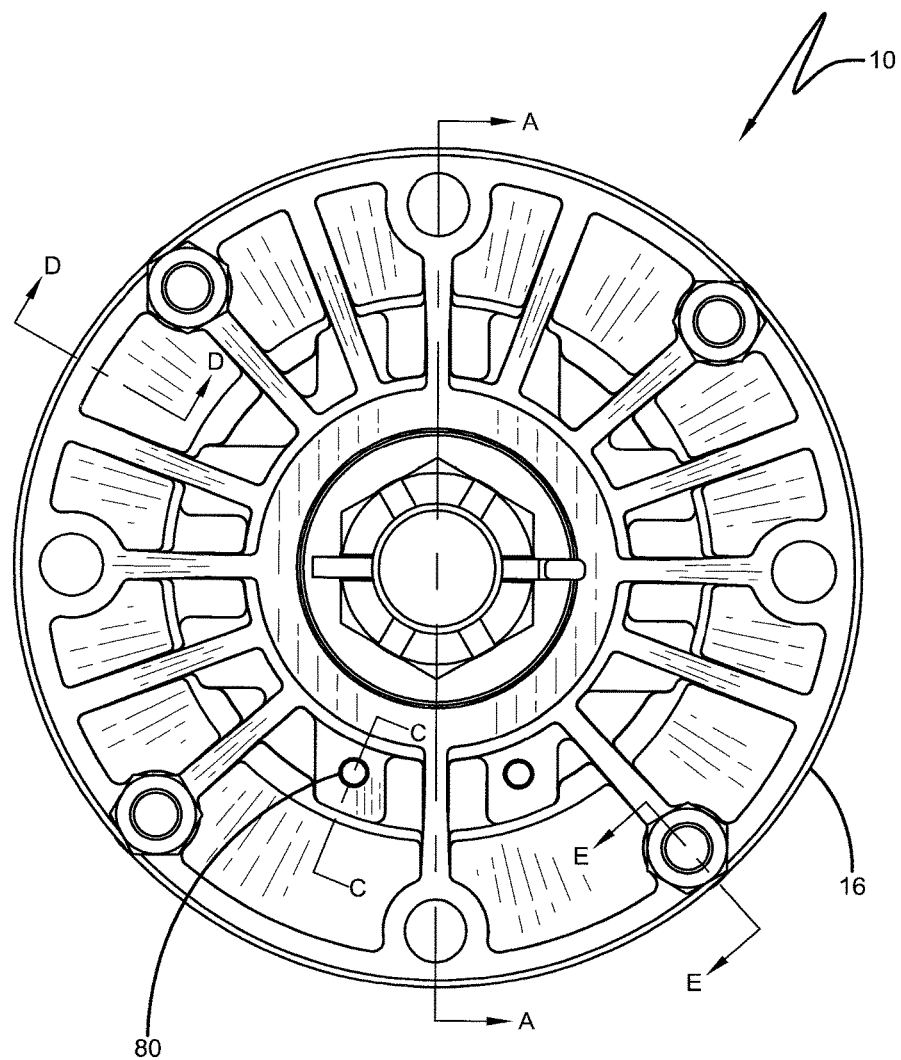
FIG. 1 is an elevational view of a brake according to the concepts of the present invention.
Figure 2:
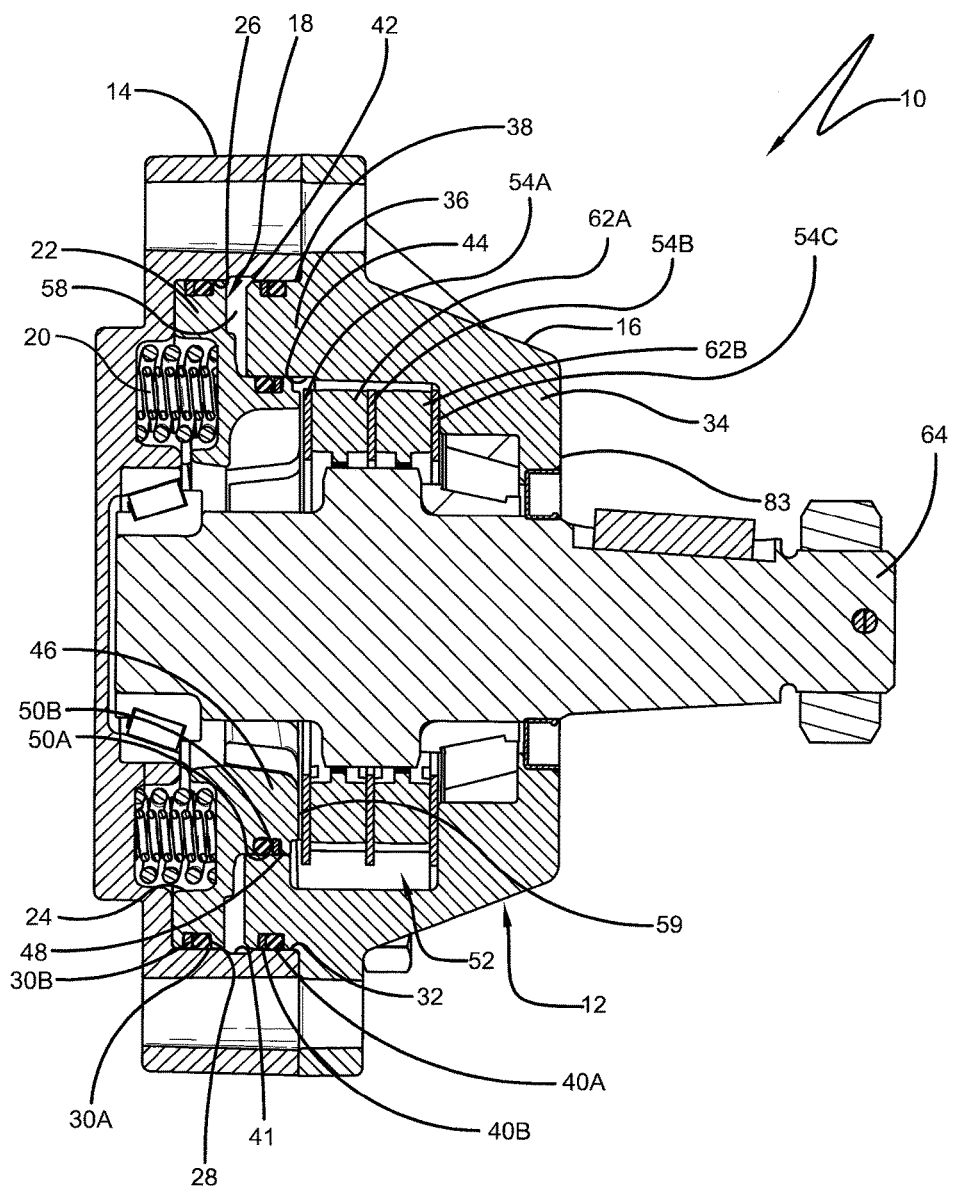
FIG. 2 is a sectional view taken substantially along line A-A of FIG. 1, showing the brake in a released position.
Figure 14:
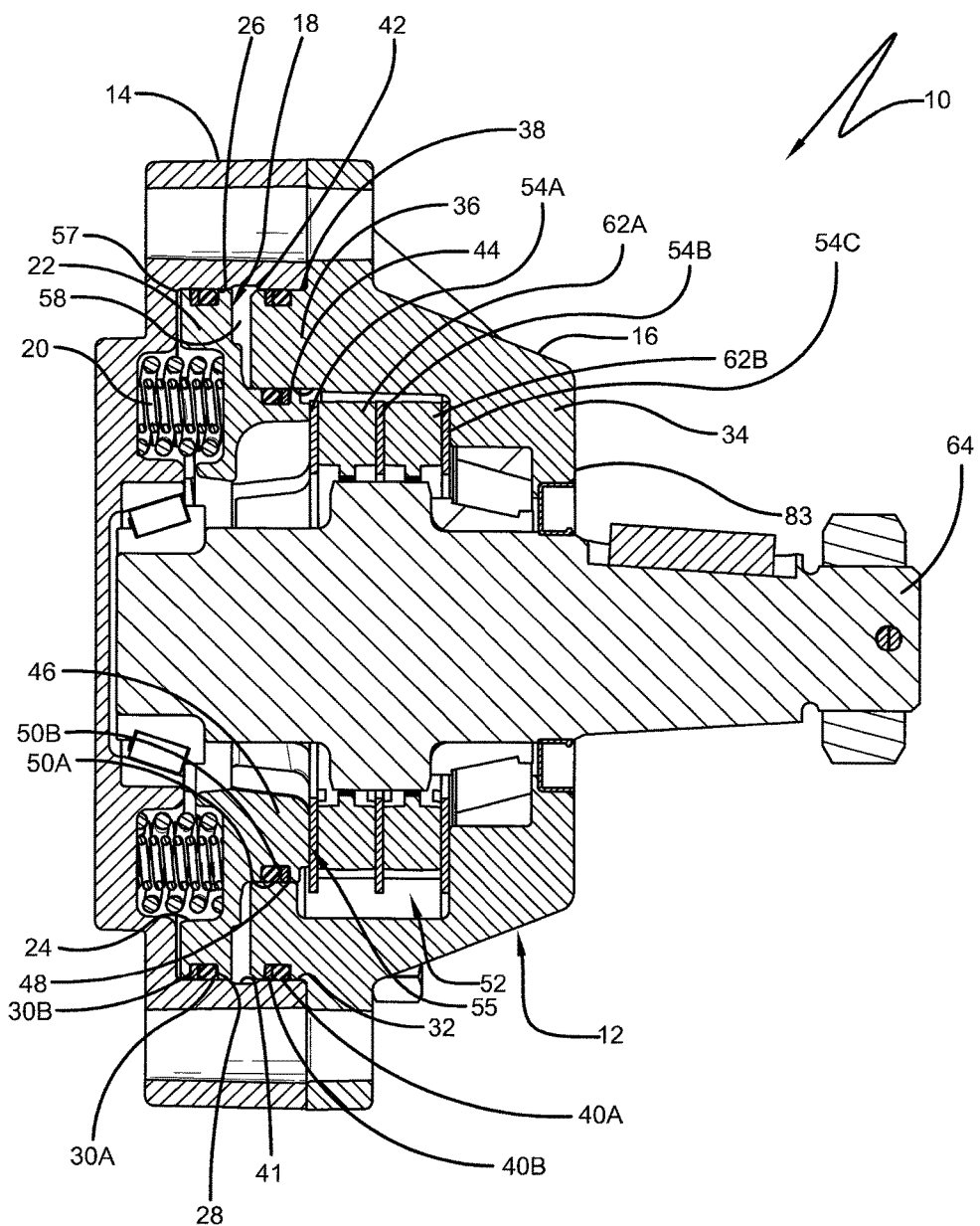
FIG. 14 is a sectional view taken substantially along line A-A of FIG. 1, showing the brake in a default or engaged position.

The "default" position of piston 18 is as shown in FIG. 14. Projecting flange 46 is engaging inboard stationary disc 54A, as shown at the numeral 55. A spacing 57 is provided between body portion 22 of piston 18 and first housing portion 14. To move piston 18 from the default position, hydraulic fluid is allowed to enter into fluid chamber 58 through hydraulic port 60. Once the pressure of the hydraulic fluid behind piston 18 is sufficient to overcome the spring force of springs 20, piston 18 travels against springs 20 until projecting flange 46 disengages inboard stationary disc 54A, thereby releasing disc stack 52. FIG. 2 shows piston 18 being disengaged from inboard stationary disc 54A, creating a spacing 59 between projecting flange 46 of piston 18 and inboard stationary disc 54A.

Figure 9:
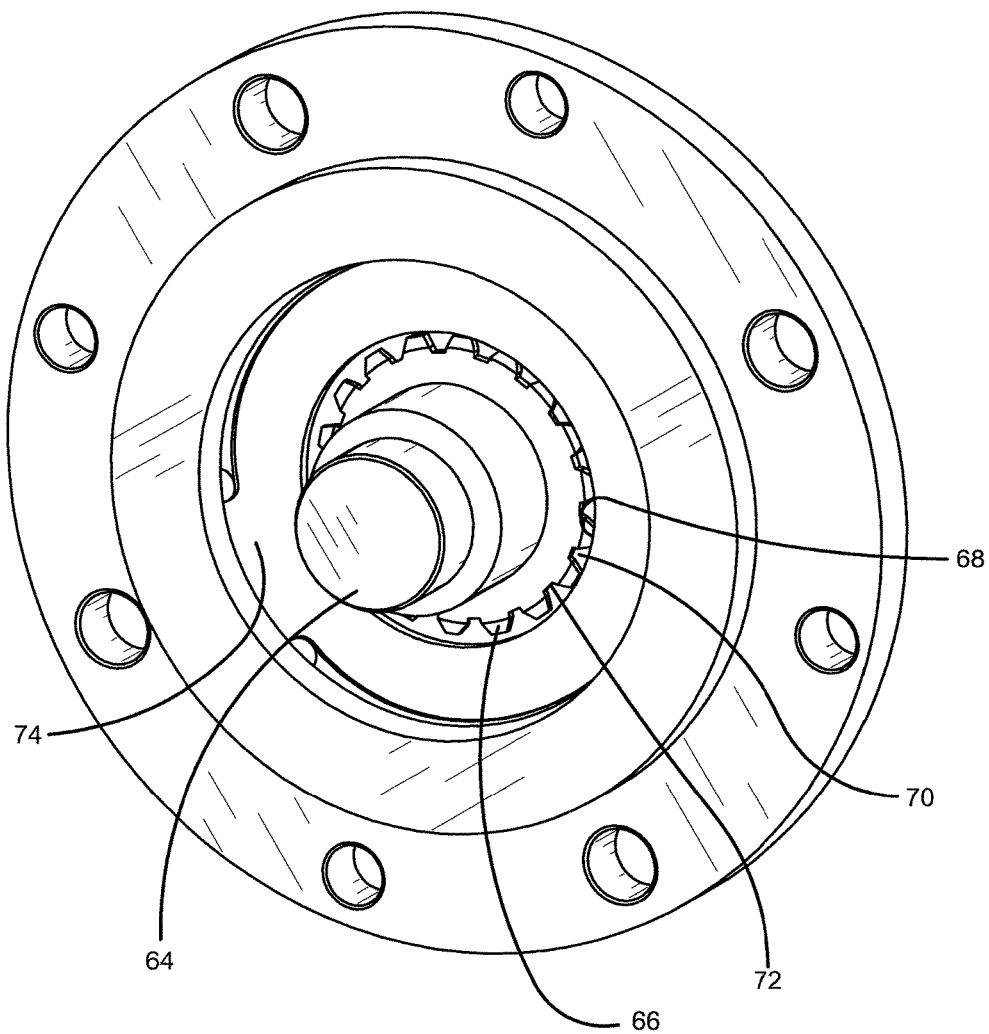
FIG. 9 is a perspective view showing a stationary disc in position in a brake.

The engaging and releasing of disc stack 52 will now be further described. Disc stack 52 includes alternating stationary discs 54A, 54B, 54C and rotating discs 62A, 62B. Rotating discs are attached to a central, rotating shaft 64 such as by a spline and groove mechanism. For example, with reference to FIG. 9, shaft 64 can include ridges 66 that mate with grooves 68 in rotating discs 62A, 62B. Similarly, ridges 70 in rotating discs 62A, 62B mate with grooves 72 in shaft 64. In one or more embodiments, this spline and groove mechanism utilizes an involute spline. Other techniques for driving discs 62A, 62B utilizing shaft 64 may also be known to those skilled in the art.

Figure 8:
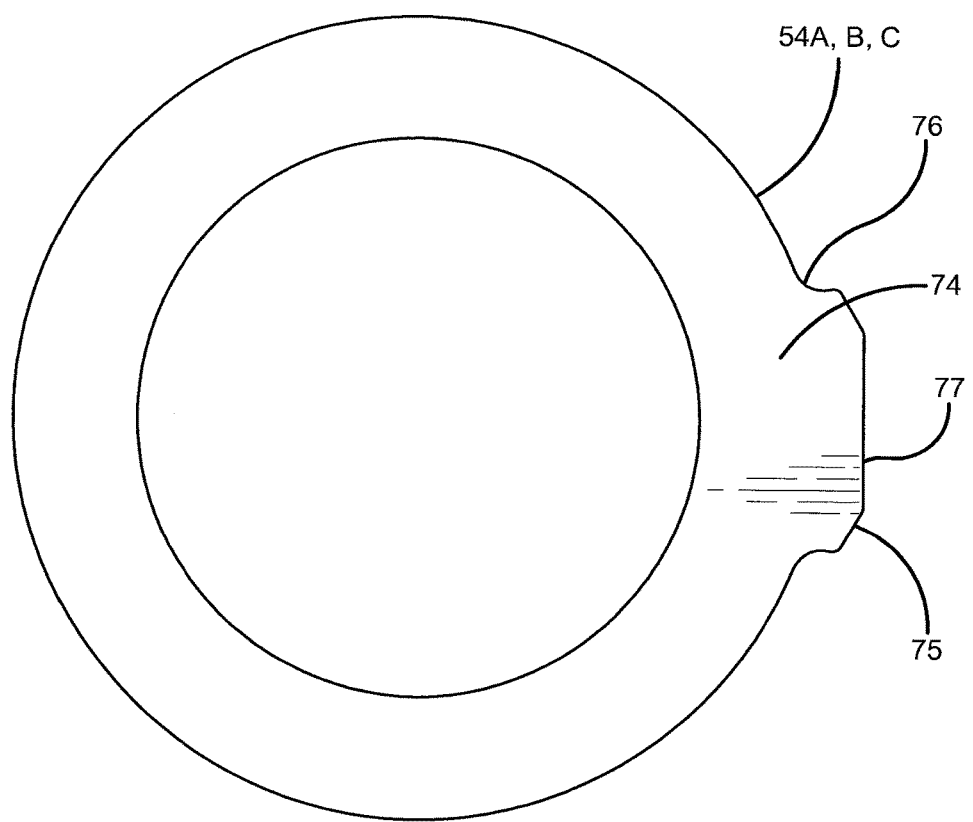
FIG. 8 is an elevational view of a stationary disc.
Figure 10:
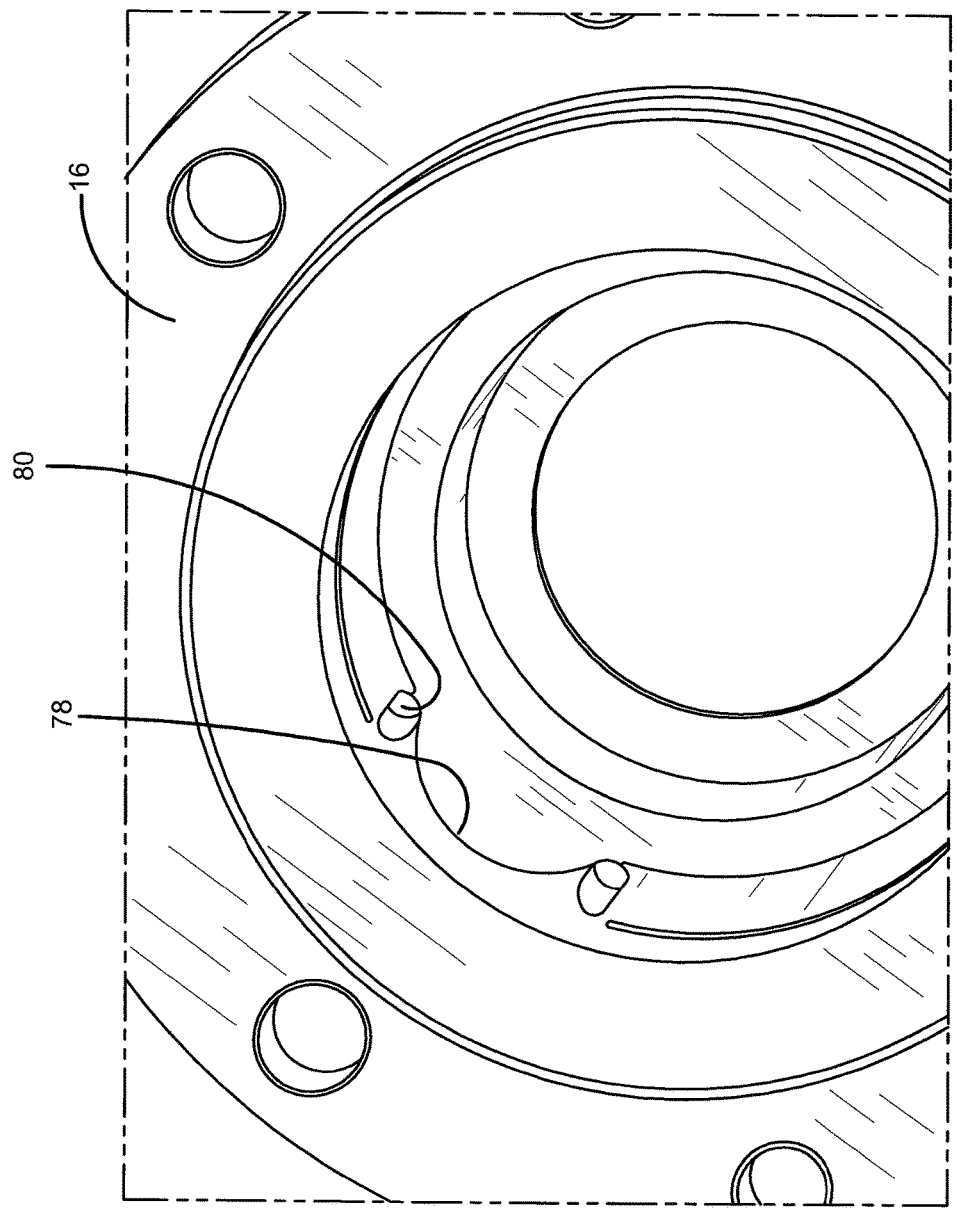
FIG. 10 is a partial perspective view of a second housing portion showing the torque pin holes and stationary disc ear relief.

While rotating discs 62A, 62B are able to rotate with shaft 64, stationary discs 54A, 54B, 54C do not rotate and do not move with respect to brake 10. Each stationary disc 54A, 54B, 54C includes an ear 74 positioned between at least two torque pin grooves 76. Ear 74 is an extension from stationary discs 54A, 54B, 54C and can be generally semi-circular in shape. In one or more embodiments, ear 74 is shaped with an angular portion 75 extending from each torque pin groove 76 to a linear portion 77, as shown in FIG. 8. Each ear 74 is capable of fitting into a relief 78 (FIG. 10) machined in second housing portion 16. In one or more embodiments, relief 78 is shaped as a semi-circular cutaway from second housing portion 16. In other embodiments, relief 78 can have a shape other than a semi-circle, such as rectangular, semi-oval, and other such shapes generally known to those skilled in the art. Relief 78 should be shaped similar to ear 74 as to receive and secure ear 74 therein.

Figure 3:
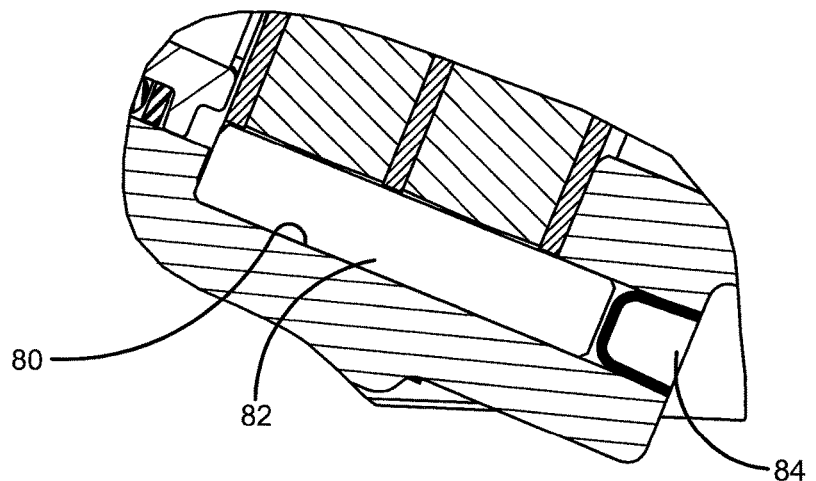
FIG. 3 is a sectional view of a torque pin taken substantially along line C-C of FIG. 1.

At least two torque pin holes 80 are also machined in second housing portion 16, with torque pin holes 80 being adapted to each receive a torque pin 82 (FIG. 3). Thus, when ear 74 is in relief 78 and torque pins 82 are in torque pin holes 80, stationary discs 54A, 54B, 54C are stationary with respect to brake 10. Notably, torque pin holes 80 do not extend to first housing portion 14; thus, first housing portion 14 can be said to be devoid of torque pin holes 80.

It should be appreciated that torque pins 82 extend at least from inboard stationary disc 54A to outboard stationary disc 54C as to secure each stationary disc in place. Torque pin holes 80 extend at least from inboard stationary disc 54A to a distal end 83 of second housing assembly 16. For assembling disc stack 52, the alternating arrangement of discs, best seen in FIG. 2, is positioned into second housing portion 16. Brake 10 may be built with distal end 83 positioned downward. Stationary disc 54C may be first inserted in second housing portion 16, then rotating disc 62B, then stationary disc 54B, then rotating disc 62A, then stationary discs 54A, to achieve the assembly arrangement shown in FIG. 2. Then, torque pins 82 may be inserted into torque pin holes 80. It should be appreciated that each torque pin hole 80 supports the torque pin 82 therein along the entire length of the pin 82. This is in contrast to certain prior art brakes where torque pins are only supported at the ends of each pin. Each torque pin hole 80 forms a full throughbore where a corresponding pin 82 is inserted. Once disc stack 52 and torque pins 82 are positioned in second housing portion 16, second housing portion 16 and first housing portion 14 may be brought together, as shown in FIG. 2.

To secure torque pins 82 in place, a plug 84, or other insertion, is added behind each torque pin 82. Plug 84 is placed into the portion of torque pin hole 80 behind the torque pin 82 to keep torque pin 82 in place. In one or more embodiments, plug 84 is a freeze plug, and in other embodiments, plug 84 can be a pipe plug. Plug 84 also prevents outside contaminants, including water, from entering brake 10.

Figure 11:
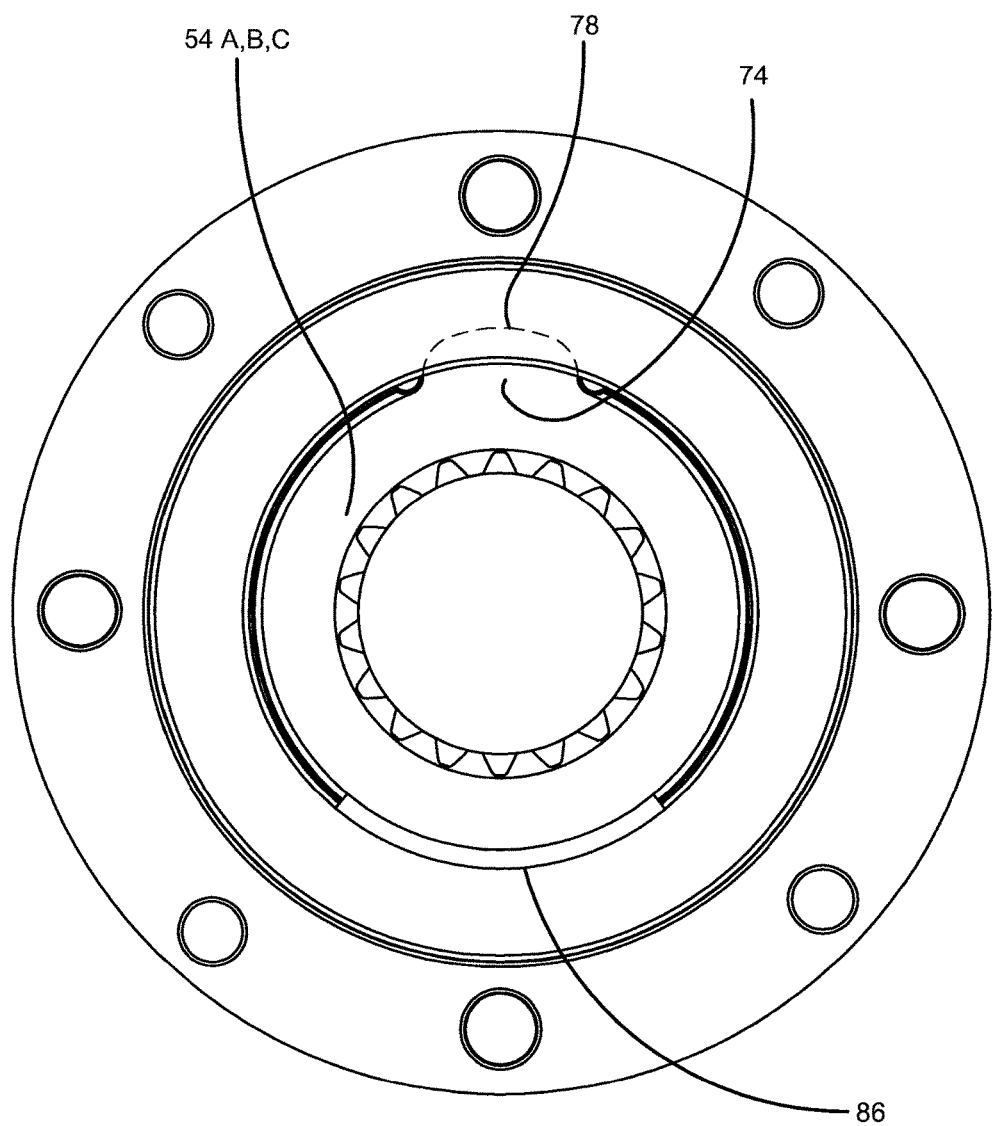
FIG. 11 is an elevation view showing an embodiment of a stationary disc in position in a brake, with a support component also positioned therein.

As shown in FIG. 11, one or more embodiments of the present invention include a metal support 86 inserted between stationary discs 54A, 54B, 54C and housing portion 16. Metal support 86 can be inserted opposite, or approximate thereto, relief 78 and prevents stationary discs 54A, 54B, 54C from contacting the housing.

Figure 12:
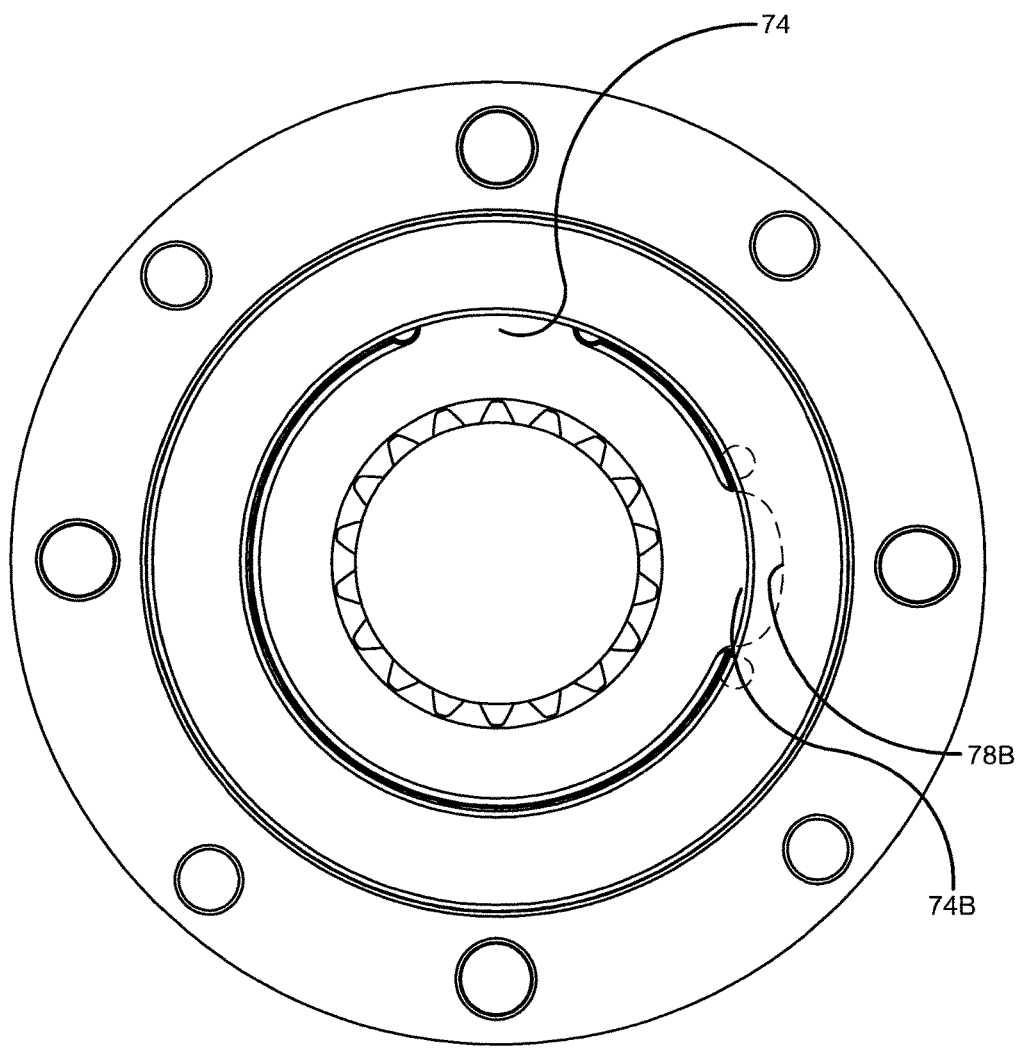
FIG. 12 is an elevation view showing another embodiment of a stationary disc in position in a brake.

As shown in FIG. 12, one or more embodiments of the present invention include a second relief 78B positioned 90 degrees, or approximate thereto, from the first relief 78. In these embodiments, stationary discs 54A, 54B, 54C include a second ear 74B that is positioned in second relief 78B, and second housing portion 16 includes additional torque pin holes 80 for receiving additional torque pins 82.

Figure 13:
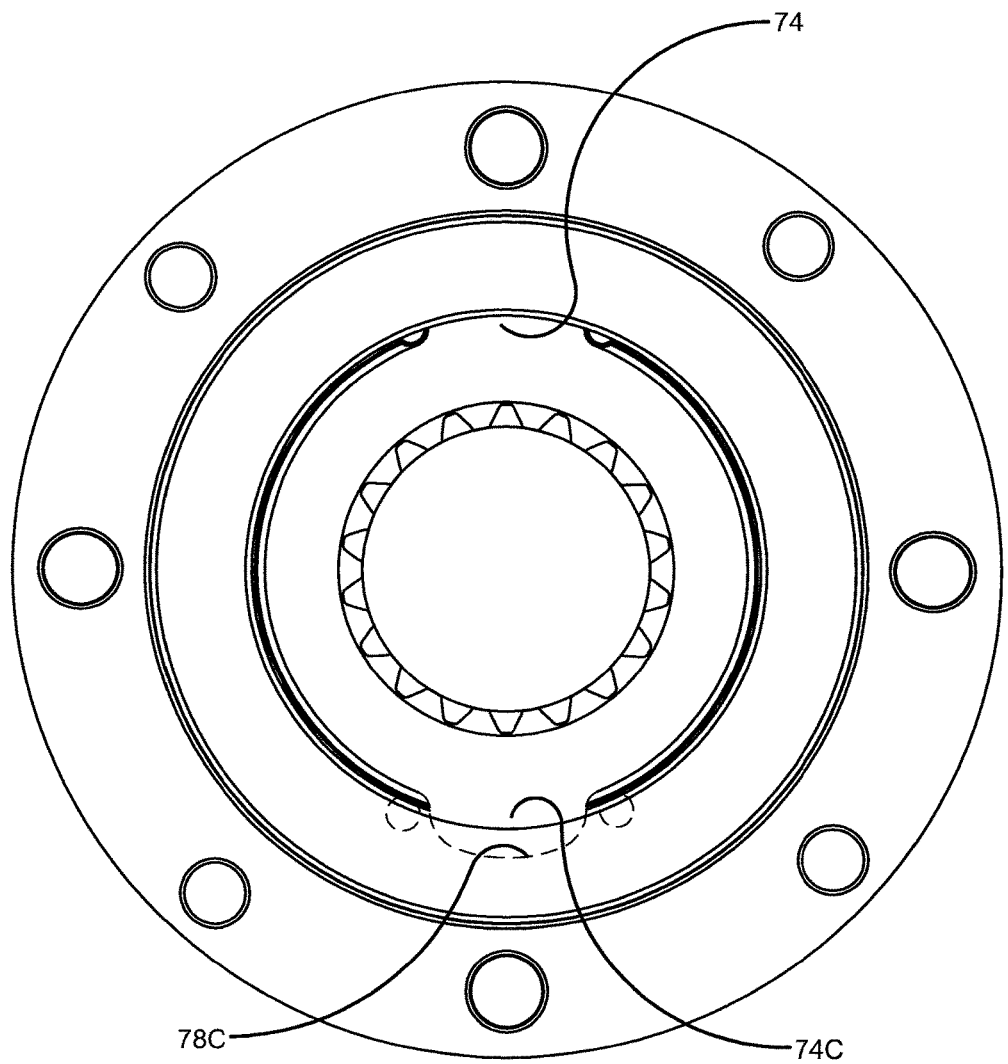
FIG. 13 is an elevation view showing another embodiment of a stationary disc in position in a brake.

As shown in FIG. 13, one or more embodiments of the present invention include a second relief 78C positioned opposite, or approximate thereto, from the first relief 78. In these embodiments, stationary discs 54A, 54B, 54C include a second ear 74C that is positioned in second relief 78C, and second housing portion 16 includes additional torque pin holes 80 for receiving additional torque pins 82.

Again, in the "default" position of piston 18, springs 20 cause projecting flange 46 to engage disc stack 52. This clamps together disc stack 52 as to clamp rotating discs 62A, 62B between stationary discs 54A, 54B, 54C, preventing rotating discs 62A, 62B from rotating. The friction in disc stack 52 is that which resists the torque on the wheel of a vehicle. In one or more embodiments, rotating discs 62A, 62B are lined with a friction material on both sides and stationary discs 54A, 54B, 54C have no friction material. In other embodiments, stationary discs 54A, 54B, 54C are lined on both sides with friction material and rotating discs 62A, 62B are unlined. In other embodiments, stationary discs 54A, 54B, 54C and rotating discs 62A, 62B are each lined on only one side. In these embodiments, the friction material side of one disc would interface with the unlined side of the next disc.

As previously discussed, this braking position is maintained until the pressure of the hydraulic fluid behind piston 18 is sufficient to overcome the spring force of springs 20. This then moves piston 18 away from disc stack 52 thereby allowing rotating discs 62A, 62B to rotate freely with central shaft 64. Brake 10 is now disengaged and the associated vehicle is able to move. Brake 10 is disengaged until the hydraulic pressure is allowed to drop as to cause piston to re-engage disc stack 52. If the associated vehicle is turned off or has a hydraulic system failure, hydraulic pressure behind piston 18 returns to zero.

Brake 10 can be sized as to fit a number of applications and vehicle sizes. Brake 10 can also be characterized by the available hydraulic force and the predetermined spring force of springs 20. In one or more embodiments, the hydraulic force available behind piston 18 is in the range of from 1000 psi to 4000 psi. In one or more embodiments, the predetermined spring clamp force of springs 20 is in the range of from 2000 lbf to 5500 lbf. In one or more embodiments, the hydraulic force and spring clamp force can each be adjusted to account for vehicle size, speed, and environment. determine the necessary clamp force. Similarly, in one or more embodiments, the necessary release pressure can be determined by what is available on the vehicle where the brake is used, and, as such, the brake 10 can be adjusted for a variety of vehicles.

Brake 10 is shown as a dry brake, but brake 10 could also be a wet brake as would be appreciated by one skilled in the art. Dry brakes experience wear directly on the friction material of the discs whereas wet brakes experience wear in the breakdown of oil in an oil sump within the brake.

Brake 10 can be made using an aluminum die cast. Using a die cast process, minimal machining is required to produce a finished brake 10. This lowers the amount of machining time, tool wear, and scrap. Using an aluminum die cast offers an improvement over sand cast iron components.

Brake 10 is designed to be used on a scissor lift or a telehandler vehicle, but could be used in any suitable vehicle. Brake 10 is particularly envisioned as being mounted to the wheel end of such a vehicle, though other suitable mounting locations are possible.

As described above, in operation of brake 10, hydraulic fluid is initiated into fluid chamber 58. Hydraulic fluid fills fluid chamber 58 and begins to increase in pressure. Once sufficient hydraulic fluid pressure is supplied to fluid chamber 58, piston 18 is able to overcome the spring force of springs 20, thereby allowing piston 18 to travel away from disc stack 52. Once piston 18 disengages disc stack 52, rotating discs 62A, 62B are able to rotate freely with central shaft 64.

After piston 18 overcomes the spring force of springs 20 to disengage brake 10, brake 10 can be re-engaged when desired. Once the operator or other vehicle conditions requires that brake 10 be re-engaged, the pressure of the hydraulic fluid is allowed to release to "zero" such that springs 20 act to re-engage piston 18 with disc stack 52.

It is thus evident that a brake constructed as described herein accomplishes the objects of the present invention and otherwise substantially improves the art.

What is claimed is:

1. A brake comprising a first housing portion, a second housing portion having a distal end, an alternating arrangement of stationary discs and rotating discs in said second housing portion, said stationary discs including an inboard stationary disc, each of said stationary discs including an ear having a width, at least two torque pin holes in said distal end of said second housing portion and extending to said inboard stationary disc, said torque pin holes having a distance therebetween, the width of each of said ears spanning the distance between said torque pin holes, and each of said torque pin holes having a torque pin positioned therein to thereby secure said stationary discs in a stationary position with respect to said second housing portion.

2. The brake of claim 1, the brake having only two of the torque pin holes.

3. A brake comprising a first housing portion, a second housing portion having a distal end, an alternating arrangement of stationary discs and rotating discs in said second housing portion, said stationary discs including an inboard stationary disc, at least two torque pin holes extending from said inboard stationary disc to said distal end of said second housing portion, a torque pin positioned in each of said torque pin holes to thereby secure said stationary discs in a stationary position with respect to said second housing portion, and a plug positioned in each of said torque pin holes to thereby secure said torque pins in a fixed position.

4. A brake comprising a first housing portion, a second housing portion having a distal end, an alternating arrangement of stationary discs and rotating discs in said second housing portion, said stationary discs including an inboard stationary disc, at least two torque pin holes extending from said inboard stationary disc to said distal end of said second housing portion, a torque pin positioned in each of said torque pin holes to thereby secure said stationary discs in a stationary position with respect to said second housing portion, a piston in said first housing portion, said piston having a body portion housing a plurality of springs therein, and a fluid chamber for receiving hydraulic fluid therein, said fluid chamber being in fluid communication with said piston.

5. The brake of claim 4, said piston having a projecting flange extending from said body portion, said projecting flange engaging said inboard stationary disc to thereby enact a braking function on said alternating arrangement of discs.

6. The brake of claim 5, wherein said piston is urged against said springs when said fluid chamber is pressurized with hydraulic fluid to thereby cause said projecting flange to disengage said inboard stationary disc to thereby allow said rotating discs to rotate.

7. A brake comprising a first housing portion, a second housing portion, an alternating arrangement of stationary discs and rotating discs in said second housing portion, each of said stationary discs including an ear having a body portion extending between two ear torque pin grooves, a relief in said second housing portion, said relief being capable of receiving each ear therein, at least two torque pin holes in said second housing portion, and a torque pin positioned in each of said torque pin holes and said ear torque pin grooves.

8. The brake of claim 7, wherein each of said ears is generally semi-circular shaped.

9. The brake of claim 7, wherein each of said stationary discs includes a second ear positioned approximately 90 degrees from said first ear.

10. The brake of claim 7, wherein each of said stationary discs includes a second ear positioned generally opposite to said first ear.

11. The brake of claim 7, the brake having only two of the torque pin holes.

12. The brake of claim 7, the body portion of each of said ears being defined by a first angular portion extending from a first of said ear torque pin grooves to a linear portion extending to a second angular portion extending to a second of said ear torque pin grooves.

13. A brake comprising a first housing portion, a second housing portion, a piston in said first housing portion, said piston having a body portion with a projecting flange extending therefrom toward said second housing portion, said piston projecting flange having an outer cylindrical surface, said second housing portion having a body portion with a projecting flange extending therefrom toward said first housing portion, said second housing projecting flange including an inner cylindrical surface engaging said outer cylindrical surface of said piston projecting flange.

14. The brake of claim 13, said first housing portion including a piston bore for receiving said body portion of said piston.

15. The brake of claim 14, said first housing portion including a pilot bore for receiving said second housing projecting flange.

16. The brake of claim 15, said piston bore and said pilot bore each having generally the same diameter.

17. The brake of claim 16, said first housing portion including a relief bore positioned between said piston bore and said pilot bore, said relief bore having a larger diameter than said piston bore and said pilot bore.

18. The brake of claim 17, said relief bore being positioned to receive a pressurized hydraulic fluid.

19. The brake of claim 18, said piston having a body portion housing at least one spring, wherein said pressurized hydraulic fluid is capable of acting against said piston to thereby overcome the force of said spring.

* * * * *